US012388198B2

(12) United States Patent
Gebhardt et al.

(10) Patent No.: US 12,388,198 B2
(45) Date of Patent: Aug. 12, 2025

(54) CONNECTION ARRANGEMENT EMPLOYING A CLAMPING SPRING AND ACTUATOR

(71) Applicant: Phoenix Contact GmbH & Co. KG, Blomberg (DE)

(72) Inventors: Martin Gebhardt, Lage (DE); Ralph Hoppmann, Bad Oeynhausen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 292 days.

(21) Appl. No.: 17/799,937

(22) PCT Filed: Feb. 16, 2021

(86) PCT No.: PCT/EP2021/053698
§ 371 (c)(1),
(2) Date: Aug. 16, 2022

(87) PCT Pub. No.: WO2021/165220
PCT Pub. Date: Aug. 26, 2021

(65) Prior Publication Data
US 2023/0064800 A1 Mar. 2, 2023

(30) Foreign Application Priority Data
Feb. 18, 2020 (DE) ..................... 10 2020 104 138.1

(51) Int. Cl.
*H01R 4/48* (2006.01)

(52) U.S. Cl.
CPC ........... *H01R 4/4833* (2023.08); *H01R 4/484* (2023.08); *H01R 4/4821* (2023.08)

(58) Field of Classification Search
CPC ..... H01R 4/4833; H01R 4/484; H01R 4/4821
See application file for complete search history.

(56) References Cited

U.S. PATENT DOCUMENTS 7,115,001 B1 10/2006 Brockman et al.
9,614,301 B2 * 4/2017 Ludewig .............. H01R 4/4833
(Continued)

FOREIGN PATENT DOCUMENTS

DE 1213024 B 3/1966
DE 202006009460 U1 3/2007
(Continued)

*Primary Examiner* — Vanessa Girardi
(74) *Attorney, Agent, or Firm* — LEYDIG, VOIT & MAYER, LTD.

(57) ABSTRACT

A connection arrangement for connecting an electrical conductor includes: a housing; a busbar; a clamping spring including a clamping leg transferrable into a clamping position and into a release position; an actuator by which a compressive force is applicable to the clamping leg for transferring the clamping leg from the clamping position into the release position; a conductor connection space formed between a section of the busbar and of the clamping leg of the clamping spring; a displaceably arranged guide element in operative connection with the clamping leg of the clamping spring, the clamping leg being holdable in the release position by the guide element; and a release element, which in the release position of the clamping leg of the clamping spring is in engagement with the guide element. The release element, during insertion of the conductor to be connected into the conductor connection space, actuates by the insertion.

16 Claims, 6 Drawing Sheets

(56) References Cited

U.S. PATENT DOCUMENTS

| | | | | |
|---|---|---|---|---|
| 10,658,766 | B2 * | 5/2020 | Herrmann ............ | H01R 4/4833 |
| 2007/0099479 | A1 | 5/2007 | Holterhoff et al. | |
| 2018/0331449 | A1 | 11/2018 | Juelich et al. | |
| 2019/0190168 | A1 | 6/2019 | Witte et al. | |
| 2022/0209435 | A1 | 6/2022 | Fehling et al. | |

FOREIGN PATENT DOCUMENTS

| | | | |
|---|---|---|---|
| DE | 202013100740 | U1 | 3/2013 |
| DE | 202014103797 | U1 | 11/2014 |
| DE | 102015118574 | A1 | 5/2017 |
| DE | 202017103185 | U1 | 9/2017 |
| DE | 202016104971 | U1 | 12/2017 |
| DE | 102016115601 | A1 | 3/2018 |
| DE | 202019101246 | U1 | 6/2019 |
| JP | H05135809 | A | 6/1993 |

* cited by examiner

CONNECTION ARRANGEMENT EMPLOYING A CLAMPING SPRING AND ACTUATOR

CROSS-REFERENCE TO PRIOR APPLICATIONS

This application is a U.S. National Phase application under 35 U.S.C. § 371 of International Application No. PCT/EP2021/053698, filed on Feb. 16, 2021, and claims benefit to German Patent Application No. DE 10 2020 104 138.1, filed on Feb. 18, 2020. The International Application was published in German on Aug. 26, 2021 as WO/2021/165220 under PCT Article 21(2).

FIELD

The invention relates to a connection arrangement for connecting an electrical conductor. The invention further relates to an electronic device.

BACKGROUND

Such connection arrangements usually have a clamping spring designed as a leg spring, which clamping spring has a retaining leg and a clamping leg, wherein a conductor inserted into the connection arrangement can be clamped against the busbar by means of the clamping leg of the clamping spring. If, in particular, flexible conductors are being clamped, the clamping spring must have already been moved, before insertion of the conductor, into a release position by means of an actuating means and thus be actuated in order to pivot the clamping spring or the clamping leg away from the busbar, so that the conductor can be inserted into the intermediate space between the busbar and the clamping spring. Only in the case of rigid and thus robust conductors can the conductor apply sufficient force to the clamping spring or the clamping leg of the clamping spring, in order to be able to pivot the clamping leg away from the busbar, without the actuating means having to be actuated for this purpose by a user. With flexible conductors, the user must first pivot the clamping spring away from the busbar by actuating the actuating means, so that the flexible conductor can be inserted. In order to clamp the inserted conductor, the actuating means must be manually actuated once more by the user in order to transfer the clamping spring from the release position into the clamping position. Actuating the actuating means by the user makes mounting or connecting the conductor more difficult for the user, since the handling is inconvenient and the time required increases as well.

SUMMARY

In an embodiment, the present invention provides a connection arrangement for connecting an electrical conductor, comprising: a housing; a busbar; a clamping spring comprising a clamping leg transferrable into a clamping position and into a release position; an actuator by which a compressive force is applicable to the clamping leg for transferring the clamping leg from the clamping position into the release position; a conductor connection space formed between a section of the busbar and of the clamping leg of the clamping spring; a displaceably arranged guide element in operative connection with the clamping leg of the clamping spring, the clamping leg being holdable in the release position by the guide element; and a release element, which in the release position of the clamping leg of the clamping spring is in engagement with the guide element, wherein the release element, during insertion of the conductor to be connected into the conductor connection space, is actuatable by the insertion such that the release element comes out of engagement with the guide element, and wherein the guide element is displaceable by a spring force of the clamping leg such that the clamping leg is transferrable into the clamping position to clamp the conductor against the busbar.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
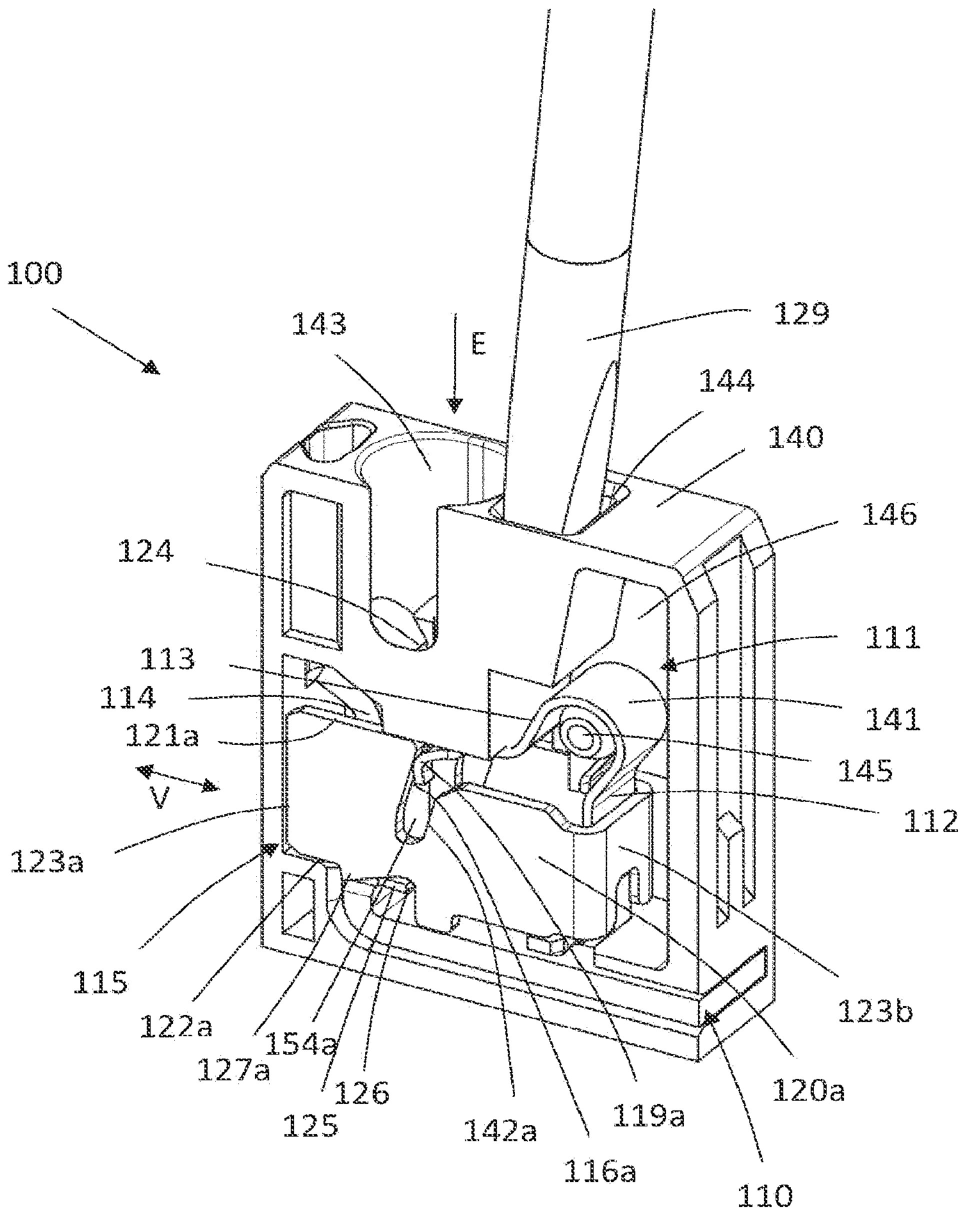
FIG. 1 is a schematic representation of a connection arrangement according to the invention with the clamping leg of the clamping spring in a clamping position.

In an embodiment, the present invention provides a connection arrangement and an electronic device with which connecting, in particular, of flexible conductors can be simplified.

The connection arrangement according to the invention has a housing, a busbar, a clamping spring, which has a clamping leg that can be transferred into a clamping position and into a release position, an actuating means by means of which a pressure force can be applied to the clamping leg in order to transfer the clamping leg from the clamping position into the release position, a conductor connection space formed between a section of the busbar and of the clamping leg of the clamping spring, a displaceably arranged guide element, which is in operative connection with the clamping leg of the clamping spring, wherein the clamping leg can be held in the release position by means of the guide element, and a release element that in the release position of the clamping spring is in engagement with the guide element. When the conductor to be connected is being inserted into the conductor connection space, the release element can be actuated by the said conductor in such a way that the release element comes out of engagement with the guide element and the guide element can be displaced by a spring force of the clamping leg in such a way that the clamping leg is transferred into the clamping position in order to clamp the conductor against the busbar.

By means of the connection arrangement according to the invention, even a flexible conductor can now be connected in a directly pluggable manner and can be clamped against the busbar. The clamping spring is preferably designed as a leg spring, which has a retaining leg and a clamping leg designed to be pivotable relative to the retaining leg. By means of a pivoting movement of the clamping leg, the clamping leg can be transferred into a release position, in which the clamping leg is arranged at a distance from the busbar and a conductor that is to be connected can be guided into or out of a conductor connection space formed thereby between the busbar and the clamping leg, and into a clamping position, in which the clamping leg can rest against the busbar or against the connected conductor in order to clamp the conductor against the busbar. The connection arrangement has a guide element that is mounted in particular horizontally displaceably and that is in particular operatively connected to the clamping spring in the release position of the clamping leg of the clamping spring, which means that the clamping leg, due to the operative connection with the guide element, follows the displacement movement and thus the position of the guide element. The guide element holds the clamping leg in the release position against its spring force in that the guide element presses against the clamping leg. To be able to hold the guide element in this position, the guide element is in engagement with the release element in the release position of the clamping leg of the clamping spring. When the release element is in engagement with the guide element, a displacement movement of the guide element is not possible or is stopped. Via an operative connection or coupling of the release element to the guide element and of the guide element to the clamping leg of the clamping spring in the release position of the clamping leg, the clamping leg can be held in this release position without additional manual actuation, so that in particular a flexible conductor can be inserted into the conductor connection space thereby free between the busbar and the clamping spring. The release element can have a pressure surface pointing in the direction of the conductor connection space, which is arranged flush with a conductor insertion opening for insertion of the conductor into the connection arrangement or flush with the conductor connection space, so that the conductor strikes the pressure surface of the release element during its insertion into the connection arrangement, as a result of which a compressive force can be applied by the conductor to the release element. By applying a compressive force to the pressure surface by means of the conductor and thus to the release element, the release element can, for example, be brought into a pivoting movement or tilting movement in the direction of the insertion direction of the conductor, so that the release element can be pivoted or tilted away from the guide element in the insertion direction of the conductor. As a result of the pivoting movement of the release element, the release element can be brought out of engagement with the guide element so that the guide element is freely displaceable again and the guide element can thereby be displaced solely by the spring force of the clamping leg, without manual assistance, in such a way that the clamping leg can be transferred from the release position into the clamping position. By means of this special mechanism, a flexible conductor can be connected in a particularly simple manner solely by the insertion movement of the conductor, without a user needing to actuate further elements, such as an actuating means, in order to release the clamping spring and transfer it from the release position into the clamping position. This facilitates the handling of the connection arrangement and saves time when connecting a conductor. The release element is preferably an element formed separately from the clamping spring, the busbar and the guide element. The release element preferably extends over the region between the clamping spring and the section of the busbar against which a conductor can be clamped, so that the release element can delimit the conductor connection space to one side. The guide element can take the form of a slide element. The transfer of the clamping leg of the clamping spring from the clamping position into the release position takes place by means of an actuating means in that a pressure force is applied to the clamping leg by means of the actuating means, whereby the clamping leg can be pivoted away from the busbar. For actuation of the clamping spring, the actuating means thus acts directly on the clamping leg of the clamping spring. However, the actuating means is preferably only used for the transfer of the clamping leg from the clamping position into the release position, but not for the transfer of the clamping leg from the release position into the clamping position.

In order to be able to form an operative connection between the guide element and the clamping leg of the clamping spring, it can be provided that the guide element has at least one spring contact edge against which the clamping leg can rest. The spring contact edge can be designed in such a way that both in the release position and in the clamping position, the clamping leg or at least a part of the clamping leg can rest against the spring contact edge. The spring contact edge preferably extends in the insertion direction of the conductor into the connection arrangement. The spring contact edge thus extends preferably transversely to the direction of displacement of the guide element. Depending on the size of the diameter of the inserted and clamped conductor, at least a part of the clamping leg can rest against the spring contact edge even in the clamping position.

In order to be able to achieve a uniform guidance of the guide element and of the clamping leg of the clamping spring, two such spring contact edges can be formed on the guide element so that the clamping leg can be guided on the guide element via two such spring contact edges. The two spring contact edges preferably extend in parallel to one another on the guide element.

With such a design, it is possible for the clamping leg to have two slide sections each arranged laterally in relation to a main section having a clamping edge, and for the guide element to have two spring contact edges arranged at a distance from one another, wherein a first slide section can rest against a first spring contact edge and a second slide section can rest against a second spring contact edge. The two slide sections preferably each have a shorter length than the main section of the clamping leg. The main section and the two slide sections preferably extend in parallel to one another. The two slide sections are preferably each curved so that they can each form a skid, which can slide along a respective spring contact edge. However, the main section is preferably straight.

If, in order to transfer the clamping leg from the clamping position to the release position by means of the actuating means, a compressive force on the clamping leg is carried out, the compressive force will preferably be transmitted from the clamping leg of the clamping spring to the guide element, so that the guide element will also be displaced away from the busbar by a pivoting movement of the clamping leg until the guide element is able to engage with the release element. For this purpose, the guide element can have a counter-contact edge, onto which the clamping leg can apply a force to the guide element during the transfer from the clamping position into the release position. During the transfer from the clamping position into the release position, the clamping leg can thus press against the counter-contact edge in order to move the guide element. The guide element can thus follow the movement of the clamping leg during transfer of the clamping leg from the clamping position into the release position. The clamping leg can preferably apply a force to the guide element via its slide section.

The guide element preferably has two counter-contact edges arranged at a distance from one another and even the clamping leg preferably has two slide sections, so that the two slide sections of the clamping leg can be pressed simultaneously against the two counter-contact edges of the guide element in order to move the guide element from the clamping position into the release position during the movement of the clamping leg.

The at least one counter-contact edge is preferably arranged opposite the at least one spring contact edge. Depending on the movement of the clamping leg, the clamping leg or a slide section of the clamping leg can thus rest alternately against the spring contact edge and against the counter-contact edge of the guide element.

The at least one guide element can have a slot-shaped recess, wherein the at least one spring contact edge and the at least one counter-contact edge can be formed in the region of the at least one slot-shaped recess. The slot-shaped recess preferably extends into the guide element. A part of the clamping leg, in particular a slide section of the clamping leg, can be immersed in and guided within the slot-shaped recess. The guide element preferably has two slot-shaped recesses arranged opposite each other, on each of which a spring contact edge and a counter-contact edge are formed, so that the two slide sections of the clamping leg can be symmetrical to one another in engagement with the guide element via the two slot-shaped recesses. Both the spring contact edge and the counter-contact edge can each form a partial section of a boundary wall of the slot-shaped recess.

The guide element is preferably displaceable in such a way that a displacement movement of the guide element into the conductor connection space can take place, said movement being transverse to an insertion direction of the conductor to be connected. In this way, a particularly compact design is possible, as a result of which the connection arrangement can be characterized by a reduced installation space.

In order to release the release element from the guide element by means of the conductor inserted into the conductor connection space and to thus be able to bring it out of engagement with the guide element, the release element can be mounted so as to be tiltable relative to the guide element. The release element can thus be designed like a rocker. If the conductor to be connected is pressed against the release element, the release element can tilt in the insertion direction of the conductor in order to come out of engagement with the guide element and thus release the guide element so that the latter is again freely displaceable.

In order to be able to form an engagement of the release element with the guide element in the release position of the clamping leg of the clamping spring, the release element can have at least one undercut with which at least one latching lug of the guide element can latch when the clamping leg of the clamping spring is in the release position. As a result, a latching connection can be formed between the guide element and the release element when the clamping leg of the clamping spring is in the release position. The release element preferably has two undercuts and the guide element preferably has two latching lugs so that a double-acting latching can be formed between the guide element and the release element. If two undercuts are provided, they are preferably formed on two side faces of the release element running in parallel to one another. The release element can have a T-shape in the region of the two undercuts.

It can preferably also be provided that the guide element has two longitudinal side walls arranged parallel to each other, which can delimit the conductor connection space on a first side and on a second side opposite the first side. The guide element can thus also form a guide for the conductor to be connected when the latter is being inserted into the conductor connection space. The two longitudinal side walls can prevent incorrect insertion of the conductor. The conductor connection space can thus be delimited on two of its sides by the guide element and on its other two sides by the busbar and by the clamping leg of the clamping spring. The spring contact edge and/or the counter-contact edge can be formed on the two longitudinal side walls.

The actuating means can be, for example, a tool, such as a screwdriver, which, if necessary, can be inserted into the housing of the connection arrangement in order to transfer the clamping leg of the clamping spring from the clamping position into the release position. For this purpose, the housing can have an opening via which the actuating means can be inserted into the housing in order to actuate the clamping leg of the clamping spring.

The opening for inserting the actuating means is preferably arranged between a conductor insertion opening formed on the housing and a bearing point of the clamping spring in the housing. In the inserted state, the actuating means is then preferably positioned between the section of the busbar against which the conductor is clamped and the clamping spring. The bearing point can be a receptacle for the arcuate section of the clamping spring between the clamping leg and the retaining leg of the clamping spring.

Furthermore, it is possible for the actuating means to be integrated into the housing and not to be a tool that is additionally to be inserted. The actuating means can then be mounted in the housing and can be linearly guided in a guide opening formed in the housing in order to pivot the clamping leg from the clamping position into the release position.

The actuating means can be designed such that it surrounds the clamping spring in a U-shape. In particular in the region of the arcuate section of the clamping spring, the actuating means can surround or overlap the clamping spring. The actuating means can thus surround the clamping spring in the form of a hood.

The actuating means can have a first actuating finger and a second actuating finger opposite the first actuating finger, wherein a side wall of the actuating means can extend between the first actuating finger and the second actuating finger, which side wall can laterally cover the clamping spring at least in regions. If the housing is designed to be open on one side, the clamping spring can be held in its position at the bearing point via the actuating means or the side wall of the actuating means, so that the clamping spring can be prevented from slipping out of the housing. The first actuating finger preferably serves to actuate the clamping leg of the clamping spring. The second actuating finger preferably covers a partial section of the retaining leg of the clamping spring. When the clamping spring is actuated by means of the actuating means, the actuating means can exert a force on the clamping leg via its first actuating finger and the second actuating finger can be guided simultaneously along the retaining leg.

The connection arrangement can form, for example, a connection terminal in the form of a terminal block that can be snapped onto a mounting rail, for example. Furthermore, the connection arrangement can also form a connection terminal that can be arranged, for example, on a printed circuit board.

It is also possible for a connection terminal arrangement to be provided, which can have a plurality of connection terminals arranged in a row, each of which can have at least one connection arrangement formed and developed as described above.

In an embodiment the present invention also provides an electronic device that can have at least one connection arrangement formed and further developed as described above.

FIGS. 1 to 6 show two different connection arrangements 100. The two connection arrangements 100 have a housing 140 that can be made of an insulating material. Except for the actuating means 129, the two connection arrangements shown in FIGS. 1 to 6 are of identical design.

Figure 2:
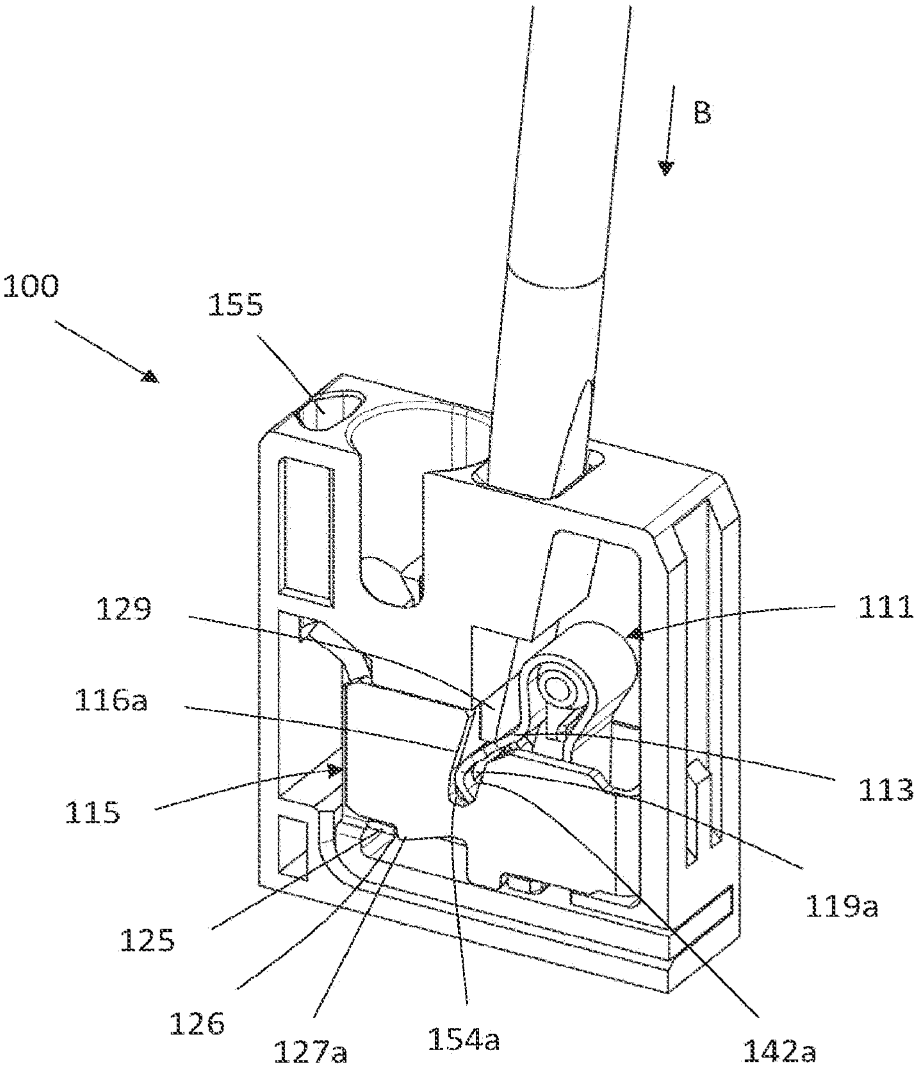
FIG. 2 is a schematic representation of the connection arrangement shown in FIG. 1 with the clamping leg of the clamping spring in a release position.
Figure 3:
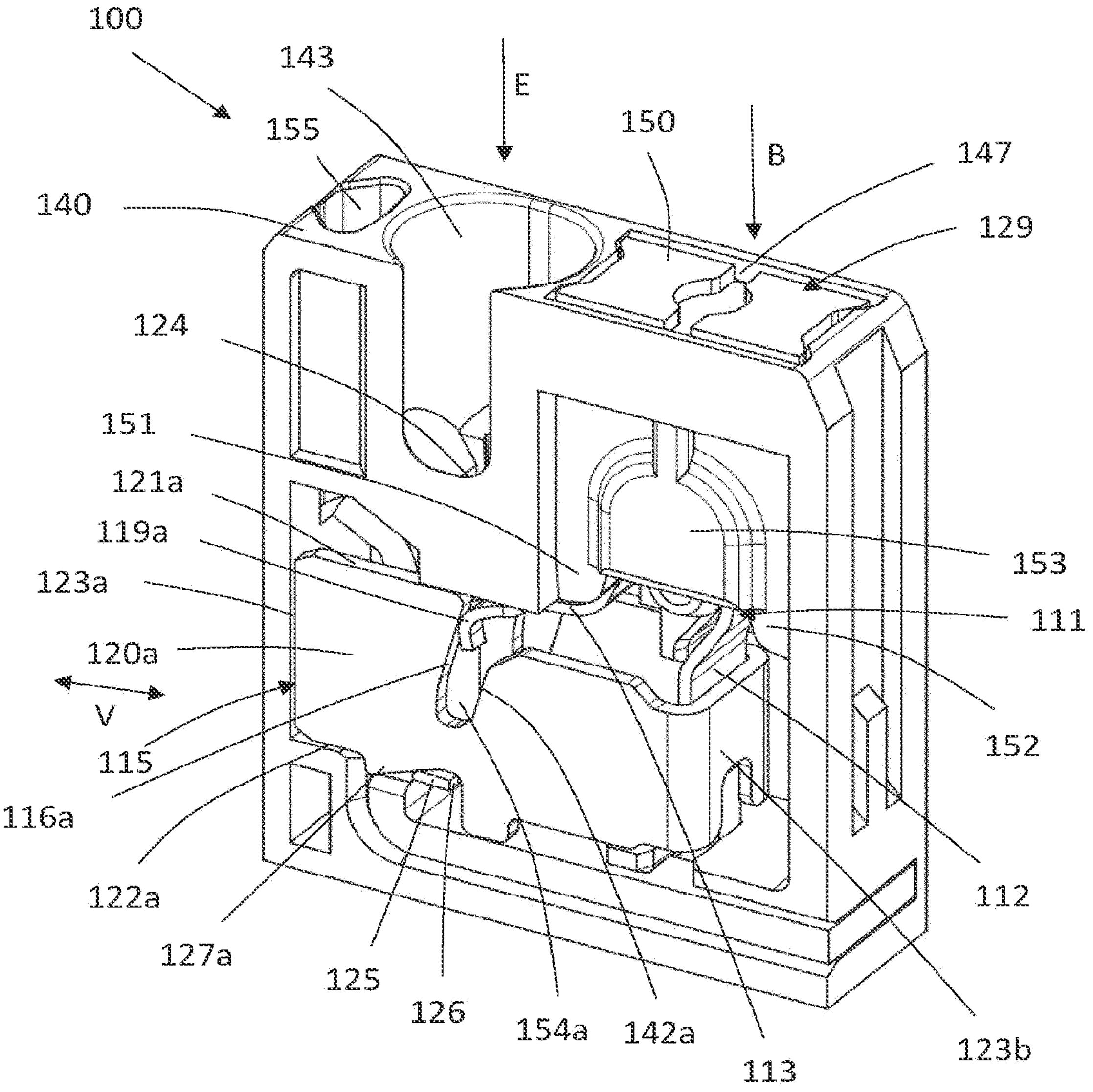
FIG. 3 is a schematic representation of a further connection arrangement according to the invention with the clamping leg of the clamping spring in a clamping position.
Figure 4:
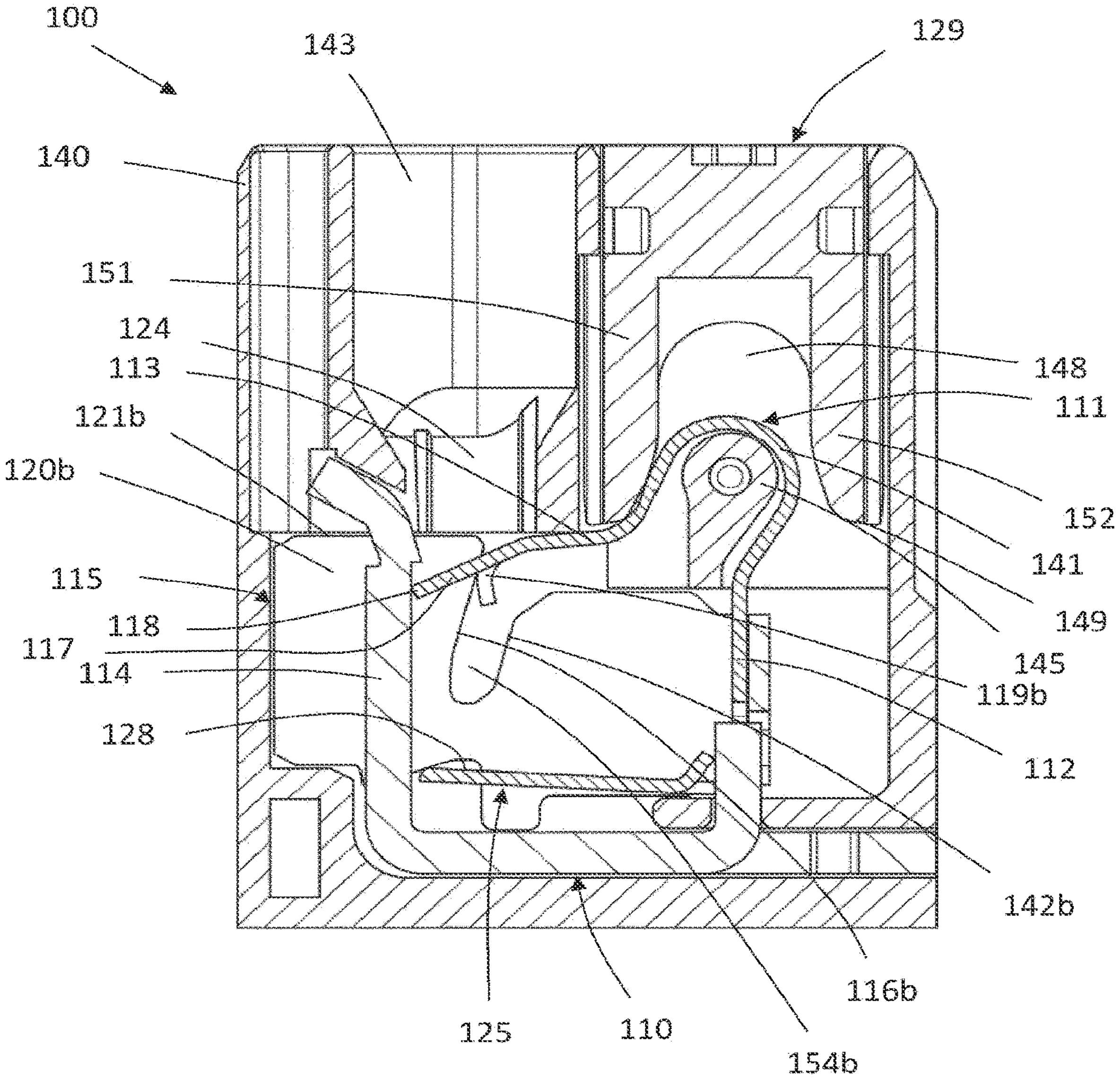
FIG. 4 is a schematic sectional representation of the connection arrangement shown in FIG. 3.
Figure 5:
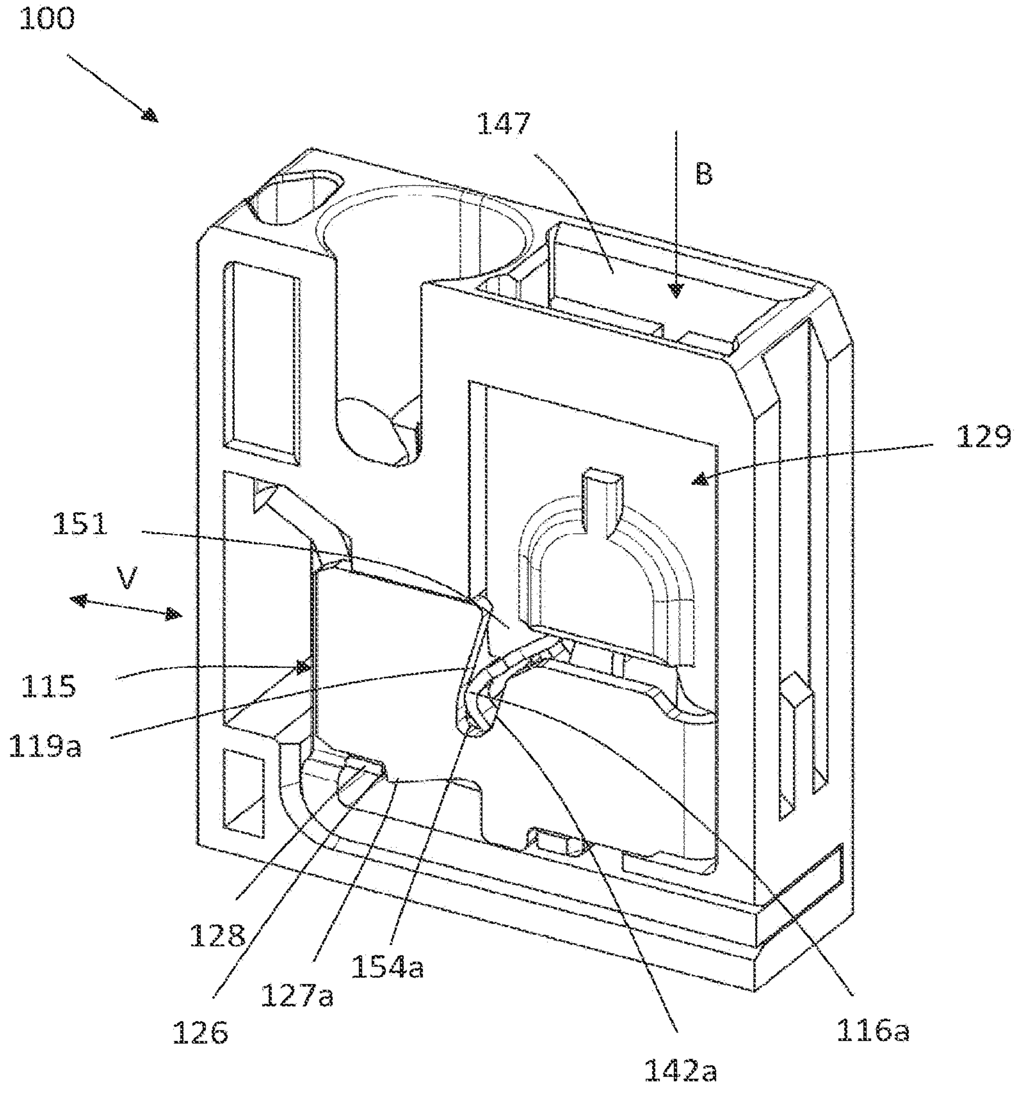
FIG. 5 is a schematic representation of the connection arrangement shown in FIG. 3 with the clamping leg of the clamping spring in a release position.
Figure 6:
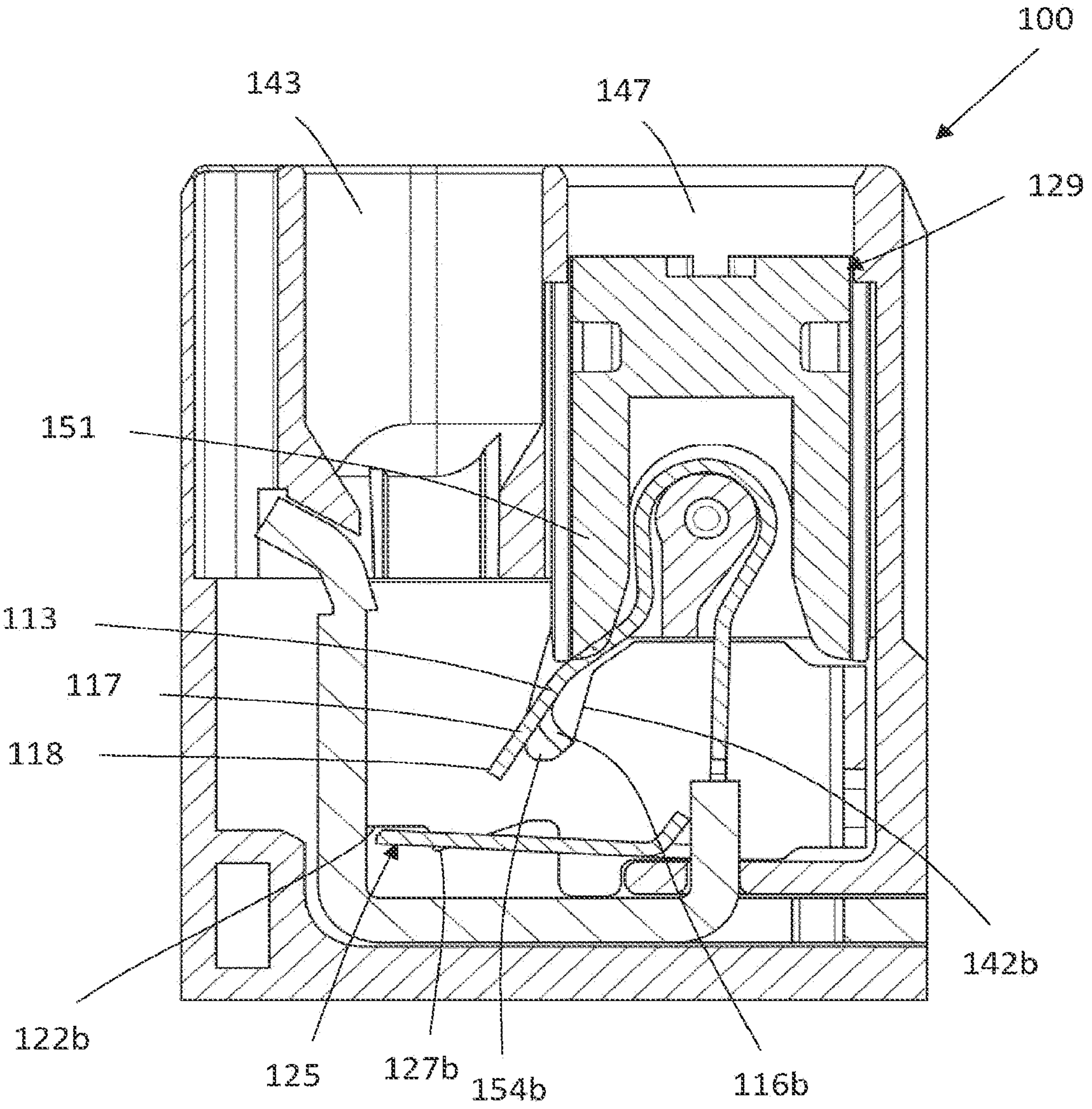
FIG. 6 is a schematic sectional representation of the connection arrangement shown in FIG. 5.

A busbar 110 and a clamping spring 111 designed as a leg spring are arranged In the housing 140. The clamping spring 111 has a retaining leg 112 and a clamping leg 113. The retaining leg 112 is connected to the clamping leg 113 via an arcuate section 141. The retaining leg 112 is held in a fixed position, whereas the clamping leg 113 is pivotable relative to the retaining leg 112. By a pivoting movement of the clamping leg 113, the latter can be transferred into a clamping position, as shown in FIGS. 1, 3 and 4, and into a release position, as shown in FIGS. 2, 5 and 6.

In the clamping position, the clamping leg 113 presses against a section 114 of the busbar 110 or against a conductor inserted into the connection arrangement 100, in order to clamp said conductor against the section 114 of the busbar 110 and connect the same. In the release position, the clamping leg 113 is positioned at a distance from the section 114 of the busbar 110, so that a conductor can be inserted into the free space thus formed that forms the conductor connection space 124 and lies between the section 114 of the busbar 110 and the clamping leg 113.

The connection arrangement 100 furthermore has a guide element 115. The guide element 115 is mounted displaceably in particular with respect to the busbar 110 so that the guide element 115 can perform a horizontal displacement movement V.

The clamping leg 113 of the clamping spring 111 can be held in the release position by means of the guide element 115. For this purpose, the guide element 115 is operatively connected to the clamping leg 113 of the clamping spring 111.

In the developments shown here, the guide element 115 has two spring contact edges 116*a*, 116*b*, which are arranged parallel to one another and against which the clamping leg 113 rests.

The clamping leg 113 has a main section 117, on the free end of which a clamping edge 118 is formed, as can be seen in the sectional views of FIGS. 4 and 6, in which a connection arrangement 100 is shown, which is identical to the embodiment shown in FIGS. 1 and 2 as regards the clamping spring 111 and the guide element 115. Two slide sections 119*a*, 119*b* are formed laterally in relation to the main section 117 so that the main section 117 is arranged between the two slide sections 119*a*, 119*b*. The two slide sections 119*a*, 119*b* rest against the two spring contact edges 116*a*, 116*b* of the guide element 115 at least in the release position and during the transfer from the release position into the clamping position, wherein the slide section 119*a* rests against the spring contact edge 116*a* and the slide section 119*b* rests against the spring contact edge 116*b*.

The slide sections 119*a*, 119*b* have a shorter length than the main section 117. The slide sections 119*a*, 119*b* are curved so that they form a skid shape, by means of which the slide sections 119*a*, 119*b* can slide along the spring contact edges 116*a*, 116*b* when the clamping leg 113 is being transferred into the clamping position.

The two spring contact edges 116*a*, 116*b* are formed on opposite longitudinal side walls 120*a*, 120*b* of the guide element 115. The two longitudinal side walls 120*a*, 120*b* are arranged in parallel to one another. The two longitudinal side walls 120*a*, 120*b* each have an upper edge 121*a*, 121*b* and an opposite lower edge 122*a*, 122*b*. The spring contact edges 116*a*, 116*b* each extend essentially perpendicular to the upper edge 121*a*, 121*b*. Starting from the horizontally extending upper edge 121*a*, 121*b*, the spring contact edges 116*a*, 116*b* extend downward in the direction of the horizontally extending lower edge 122*a*, 122*b* of the guide element 115.

The busbar 110 and the clamping spring 111 are arranged between the two longitudinal side walls 120*a*, 120*b* of the guide element 115. The busbar 110 and the clamping spring 111 are enclosed by the guide element 115.

The guide element 115 furthermore has two end walls 123*a*, 123*b*, which are aligned parallel to one another. The two end walls 123*a*, 123*b* are arranged transversely to the two longitudinal side walls 120*a*, 120*b* of the guide element 115.

A conductor connection space 124, into which a conductor to be connected can be inserted, is formed between the section 114 of the busbar 110 and the clamping leg 113. The conductor connection space 124 is laterally covered or delimited by the two longitudinal side walls 120*a*, 120*b* of the guide element 115 so that the guide element 115 also forms a guide for the conductor to be connected.

The conductor connection space 124 is designed to align with a conductor insertion opening 143 formed in the housing 140, via which the conductor to be connected can be inserted into the housing 140 of the connection arrangement 100 in the insertion direction E.

The connection arrangement 100 also has a release element 125. The release element 125 is arranged flush with the conductor insertion opening 143 and the conductor connection space 124. The release element 125 delimits the conductor connection space 124 downwardly.

In the release position of the clamping leg 113 of the clamping spring 111, the release element 125 is in engagement with the guide element 115, as can be seen in FIGS. 2, 5 and 6, as a result of which the guide element 115 is held in its position and is thus also held in its position via the spring contact edges 116*a*, 116*b* and the slide sections 119*a*, 119*b* of the clamping legs 113, so that an undesired pivoting back of the clamping leg 113 from the release position into the clamping position can be prevented.

The release element 125 has two laterally arranged undercuts 126 that, in the release position of the clamping leg 113 of the clamping spring 111, are in engagement with a respective latching lug 127*a*, 127*b* of the guide element 115 in order to form a latching between the guide element 115 and the release element 125. The latching lug 127*a* is formed on the lower edge 122*a* of the longitudinal side wall 120*a*, and the latching lug 127*b* is formed on the lower edge 122*b* of the longitudinal side wall 120*b*.

In the clamping position, the release element 125 is out of engagement with the guide element 115, as can be seen in FIGS. 1, 3 and 4, so that the guide element 115 is freely displaceable.

The release element 125 is mounted so as to be tiltable relative to the guide element 115.

When a conductor to be connected is being inserted along the insertion direction E via the conductor insertion opening 143 into the conductor connection space 124, the conductor bumps against the release element 125, as a result of which the release element 125 is tilted relative to the guide element 115 and thereby comes out of engagement with the guide element 115, so that the guide element 115 can be freely displaced again, and the guide element 115 can thereby be displaced by the spring force of the clamping leg 113 alone, without manual assistance, in such a way that the clamping leg 113 can be transferred from the release position into the clamping position.

The release element 125 has a pressure surface 128 that points in the direction of the conductor connection space 124 and is arranged flush with the conductor insertion opening 143 or flush with the conductor connection space 124, so that the conductor bumps against the pressure surface 128 of the release element 125 when it is being inserted into the connection arrangement 100, as a result of which a compressive force is applied by the conductor to the release element 125. By applying a compressive force by means of the conductor to the pressure surface 128 and thus to the release element 125, the release element 125 can be brought into a pivoting movement or tilting movement in the direction of the insertion direction E of the conductor so that the release element 125 can be pivoted or tilted away from the guide element 115 in the insertion direction E of the conductor.

When the guide element 115 is out of engagement with the release element 125, the displacement movement V of said guide element takes place in a direction that is oriented transversely to the insertion direction E of the conductor to be connected into the conductor connection space 124.

Furthermore, a counter-contact edge 142*a*, 142*b* is formed on each of the two longitudinal side walls 120*a*, 120*b*. When the clamping leg 113 is being transferred from the clamping position to the release position, the clamping leg 113 presses with its two slide sections 119*a*, 119*b* against the two counter-contact edges 142*a*, 142*b*, as can be seen in FIGS. 2, 5 and 6, as a result of which the guide element 115 follows the pivoting movement of the clamping leg 113 and is shifted to such an extent by a displacement movement V until the guide element 115 with its latching lugs 127*a*, 127*b* comes into engagement with the release element 125 and latches there.

The two counter-contact edges 142*a*, 142*b* are arranged on the respective longitudinal side wall 120*a*, 120*b* of the guide element 115 opposite the spring contact edges 116*a*, 116*b*.

The longitudinal side walls 120*a*, 120*b* each have a slot-shaped recess 154*a*, 154*b*, in which the clamping leg 113 is immersed with its two slide sections 119*a*, 119*b*. The spring contact edge 116*a*, 116*b* and the counter-contact edge 142, 142*b* of a longitudinal side wall 120*a*, 120*b* each form a part of a boundary wall of the slot-shaped recess 154*a*, 154*b* of the respective longitudinal side wall 120*a*, 120*b*. The two slot-shaped recesses 154*a*, 154*b* are formed symmetrical or parallel to one another on the two longitudinal side walls 120*a*, 120*b*.

In the embodiments shown in FIGS. 1 to 6, the clamping leg 113 is transferred from the clamping position into the release position by means of an actuating means 129. The connection arrangements 100 shown in FIGS. 1 to 6 are identical to one another except for the type and guidance of the actuating means 129.

In the embodiment shown in FIGS. 1 and 2, the actuating means 129 is a tool that is to be inserted separately into the housing 140 and that is shown here in the form of a screwdriver. The housing 140 has an opening 144 via which the actuating means 129 can be inserted into the housing 140 in order to actuate the clamping leg 113 of the clamping spring 111.

The opening 144 for the insertion of the actuating means 129 is arranged between the conductor insertion opening 143 and a bearing position 145 of the clamping spring 111 in the housing 140. The bearing point 145 is in the form of a pin that projects from a rear wall 146 of the housing 140. Via its arcuate section 141, the clamping spring 111 is attached to the bearing point 145.

In the embodiment shown in FIGS. 3 to 6, the actuating means 129 is integrated into the housing 140 by the actuating means 129 being mounted in the housing 140 and being linearly guidable in a guide opening 147 formed in the housing 140. The guide opening 147 extends parallel to the conductor insertion opening 143, so that the actuation direction B of the actuating means 129 is directed parallel to the insertion direction E of the conductor into the housing 140.

As can be seen in the sectional view of FIGS. 4 and 6, the actuating means 129 surrounds the clamping spring 111 in a U-shape. The actuating means 129 has a recess 148 into which the clamping spring 111 is immersed in particular in the region of its arcuate section 141, so that the actuating means 129 surrounds around or overlaps the clamping spring 111. The actuating means 129 can thus surround the clamping spring 111 in the form of a hood. The recess 148 is formed in the middle of the actuating means 129. Starting from a lower side 149 of the actuating means 129 directed in the direction of the clamping spring 111, the recess 148 extends in the direction of an upper side 150 of the actuating means 129. The upper side 150 forms an actuating surface for actuating the actuating means 129.

The actuating means 129 is designed in such a way that it has a first actuating finger 151 and a second actuating finger 152 opposite the first actuating finger 151, a side wall 152 of the actuating means 129 extending between the first actuating finger 151 and the second actuating finger 152, said side wall laterally covering the clamping spring 111 at least in regions. However, the housing 140 has only a rear wall 146 but no opposite front wall, and the housing 140 is thus designed to be open on one side here, so that the clamping spring 111 is held in its position at the bearing point 145 via the actuating means 129 or the side wall 152 of the actuating means 129, so that the clamping spring 111 is prevented from slipping out of the housing 140 in the region of the front side where the housing 140 does not have a wall.

The underside 149 of the actuating means 129 is formed by the two free ends of the actuating fingers 151, 152.

The first actuating finger 151 serves to actuate the clamping leg 113 of the clamping spring 111 in that the first actuating finger 151 rests directly against the clamping leg 113 and can slide along it. The second actuating finger 152 is guided essentially parallel to the retaining leg 112 of the clamping spring 111. The arcuate section 141 of the clamping spring 111 is arranged between the two actuating fingers 151, 152.

In the two embodiments shown in FIGS. 1 to 6, a test opening 155 is further formed on the housing 140, via which a test plug can be inserted into the connection arrangement 100. The test opening 155 is arranged directly next to the conductor insertion opening 143.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection arrangement
110 Busbar
111 Clamping spring
112 Retaining leg
113 Clamping leg
114 Section of the current bar
115 Guide element
116*a*, 116*b* Spring contact edge
117 Main section
118 Clamping edge
119*a*, 119*b* Slide section
120*a*, 120*a* Longitudinal side wall
121*a*, 121*b* Upper edge
122*a*, 122*b* Lower edge
123*a*, 123*b* End wall
124 Conductor connection space
125 Release element
126 Undercut
127*a*, 127*b* Latching lug
128 Pressure surface
129 Actuating means
140 Housing
141 Arcuate section
142*a*, 142*b* Counter-contact edge
143 Conductor insertion opening
144 Opening
145 Bearing point
146 Rear wall
147 Guide opening
148 Recess
149 Underside
150 Upper side
151 First actuating finger
152 Second actuating finger
153 Side wall
154*a*, 154*b* Slot-shaped recess
155 Test opening
V Displacement movement
E Insertion direction
B Actuation direction

The invention claimed is:

1. A connection arrangement for connecting an electrical conductor, comprising:
- a housing;
- a busbar;
- a clamping spring comprising a clamping leg transferrable into a clamping position and into a release position;
- an actuator by which a compressive force is applicable to the clamping leg for transferring the clamping leg from the clamping position into the release position;
- a conductor connection space formed between a section of the busbar and of the clamping leg of the clamping spring;
- a displaceably arranged guide element in operative connection with the clamping leg of the clamping spring, the clamping leg being holdable in the release position by the guide element; and
- a release element, which in the release position of the clamping leg of the clamping spring is in engagement with the guide element,
- wherein the release element, during insertion of the conductor to be connected into the conductor connection space, is actuatable by the insertion such that the release element comes out of engagement with the guide element,
- wherein the guide element is displaceable by a spring force of the clamping leg such that the clamping leg is transferrable into the clamping position to clamp the conductor against the busbar,
- wherein the actuator is mounted in the housing and is linearly guidable in a guide opening formed in the housing, and
- wherein the actuator surrounds the clamping spring in a U-shape.

2. A connection arrangement for connecting an electrical conductor, comprising:
- a housing;
- a busbar;
- a clamping spring comprising a clamping leg transferrable into a clamping position and into a release position;
- an actuator by which a compressive force is applicable to the clamping leg for transferring the clamping leg from the clamping position into the release position;
- a conductor connection space formed between a section of the busbar and of the clamping leg of the clamping spring;
- a displaceably arranged guide element in operative connection with the clamping leg of the clamping spring, the clamping leg being holdable in the release position by the guide element; and
- a release element, which in the release position of the clamping leg of the clamping spring is in engagement with the guide element,
- wherein the release element, during insertion of the conductor to be connected into the conductor connection space, is actuatable by the insertion such that the release element comes out of engagement with the guide element,
- wherein the guide element is displaceable by a spring force of the clamping leg such that the clamping leg is transferrable into the clamping position to clamp the conductor against the busbar, and wherein the guide element has two longitudinal side walls arranged parallel to each other, which delimit the conductor connection space on a first side and on a second side opposite the first side.

3. A connection arrangement for connecting an electrical conductor, comprising:

a housing;

a busbar;

a clamping spring comprising a clamping leg transferrable into a clamping position and into a release position;

an actuator by which a compressive force is applicable to the clamping leg for transferring the clamping leg from the clamping position into the release position;

a conductor connection space formed between a section of the busbar and of the clamping leg of the clamping spring;

a displaceably arranged guide element in operative connection with the clamping leg of the clamping spring, the clamping leg being holdable in the release position by the guide element; and a release element, which in the release position of the clamping leg of the clamping spring is in engagement with the guide element, wherein the release element, during insertion of the conductor to be connected into the conductor connection space, is actuatable by the insertion such that the release element comes out of engagement with the guide element, wherein the guide element is displaceable by a spring force of the clamping leg such that the clamping leg is transferrable into the clamping position to clamp the conductor against the busbar, wherein the guide element is displaceable such that a displacement movement of the guide element takes place transversely to an insertion direction of the conductor to be connected into the conductor connection space, and wherein the guide element and the actuator are separate elements.

4. The connection arrangement of claim 3, wherein the release element is mounted tiltably relative to the guide element.

5. The connection arrangement of claim 3, wherein the release element has at least one undercut, which in the release position of the clamping leg of the clamping spring, is latched with at least one latching lug of the guide element.

6. The connection arrangement of claim 3, wherein the guide element has two longitudinal side walls arranged parallel to each other, which delimit the conductor connection space on a first side and on a second side opposite the first side.

7. The connection arrangement of claim 3, wherein the guide element has at least one spring contact edge against which the clamping leg rests.

8. The connection arrangement of claim 7, wherein the clamping leg has two slide sections each arranged laterally in relation to a main section having a clamping edge, wherein the guide element has two spring contact edges arranged at a distance from one another, and wherein a first slide section rests against a first spring contact edge and a second slide section rests against a second spring contact edge.

9. The Connection arrangement of claim 3, wherein the housing has an opening via which the actuator is guidable to the clamping leg of the clamping spring.

10. The connection arrangement of claim 9, wherein the opening for inserting the actuator is arranged between a conductor insertion opening formed on the housing and a bearing point of the clamping spring in the housing.

11. The connection arrangement of claim 3, wherein the guide element has at least one counter-contact edge on which the clamping leg is configured to apply a force on the guide element during transfer from the clamping position into the release position.

12. The connection arrangement of claim 11, wherein the at least counter-contact edge is arranged opposite the at least one spring contact edge.

13. The connection arrangement of claim 11, wherein the at least one guide element has a slot-shaped recess, and wherein the at least one spring contact edge and the at least one counter-contact edge are formed in a region of the at least one slot-shaped recess.

14. The connection arrangement of claim 3, wherein the actuator is mounted in the housing and is linearly guidable in a guide opening formed in the housing.

15. The connection arrangement of claim 14, wherein the actuator surrounds the clamping spring in a U-shape.

16. The connection arrangement of claim 14, wherein the actuator has a first actuating finger and a second actuating finger opposite the first actuating finger, and wherein a side wall of the actuator extends between the first actuating finger and the second actuating finger, the side wall laterally covering the clamping spring at least in regions.

* * * * *